(12) United States Patent
Fu et al.

(10) Patent No.: US 11,293,593 B2
(45) Date of Patent: Apr. 5, 2022

(54) SYSTEM TO RECOVER NEGATIVE ENERGY FROM LIQUEFIED NATURAL GAS

(71) Applicant: Shenzhen Fulian Fugui Precision Industry Co., Ltd., Shenzhen (CN)

(72) Inventors: Yen-Chun Fu, New Taipei (TW); Tze-Chern Mao, New Taipei (TW); Chao-Ke Wei, New Taipei (TW); Chih-Hung Chang, New Taipei (TW)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 382 days.

(21) Appl. No.: 16/394,348

(22) Filed: Apr. 25, 2019

(65) Prior Publication Data

US 2020/0263831 A1 Aug. 20, 2020

(30) Foreign Application Priority Data

Feb. 18, 2019 (CN) .......................... 201910120136.9

(51) Int. Cl.
*F17C 9/04* (2006.01)
*F17C 5/06* (2006.01)

(52) U.S. Cl.
CPC .................. *F17C 9/04* (2013.01); *F17C 5/06* (2013.01); *C01B 2203/1241* (2013.01); *F17C 2221/033* (2013.01); *F17C 2223/0161* (2013.01); *F17C 2227/0362* (2013.01)

(58) Field of Classification Search
CPC ........ F17C 9/04; F17C 5/06; F17C 2221/033; F17C 2223/0161; F17C 2227/0362; C01B 2203/1241

USPC ................................................................ 62/7
See application file for complete search history.

(56) References Cited

U.S. PATENT DOCUMENTS

2003/0101728 A1* 6/2003 Wakana ................. F25J 1/0045
60/727

FOREIGN PATENT DOCUMENTS

| CN | 102967099 A | 3/2013 |
| CN | 103574982 A | 2/2014 |
| CN | 105401989 A | 3/2016 |

* cited by examiner

*Primary Examiner* — Timothy P. Kelly
*Assistant Examiner* — Christopher M Afful
(74) *Attorney, Agent, or Firm* — ScienBiziP, P.C.

(57) ABSTRACT

A system for better utilization of liquefied natural gas (LNG) on gasification of the liquid includes a gas power generation subsystem, a steam power generation subsystem, an energy storage subsystem, and a cooling subsystem. A gasification device of the gas power generation subsystem renders the LNG gaseous and collects cold energy generated during the gasification. The gas is supplied to the gas power generation device for generating electrical power and the cold energy is supplied to the steam power generation subsystem and the cold storage subsystem. Electrical power generated by the gas power generation subsystem and the steam power generation subsystem is supplied to the cooling subsystem, and the energy stored in the energy storage subsystem is also supplied to the cooling subsystem.

11 Claims, 5 Drawing Sheets

SYSTEM TO RECOVER NEGATIVE ENERGY FROM LIQUEFIED NATURAL GAS

FIELD

The subject matter herein generally relates to energy utilization of liquefied natural gas systems.

BACKGROUND

A large amount of energy is extracted from liquified natural gas (LNG) during the liquifaction process and more energy can be extracted during the gasification process. In related art, there is no systematic integration of negative energy (as hereinafter explained) recovery, power generation, and energy storage. Therefore, heat-absorbing of LNG generally has a low utilization efficiency.

A liquefied natural gas system should have these features.

BRIEF DESCRIPTION OF THE DRAWINGS

Implementations of the present technology will now be described, by way of embodiments, with reference to the attached figures.

DETAILED DESCRIPTION

The present disclosure is made in conjunction with the accompanying drawings. Specific embodiments of the present disclosure are described.

In the following description, when an element is described as being "fixed to" another element, the element can be fixed to another element with or without intermediate elements. When an element is described as "connecting" or "connecting to" another element, the element can be connected to the other element with or without intermediate elements. The term "negative energy" or "cold energy" refers to the heat-absorbing properties of a sub stance.

Without definition otherwise, all terms are of the same meaning as commonly understood by those skilled in the art. The term "and/or" means including any and all combinations of one or more of associated listed items.

Figure 1:
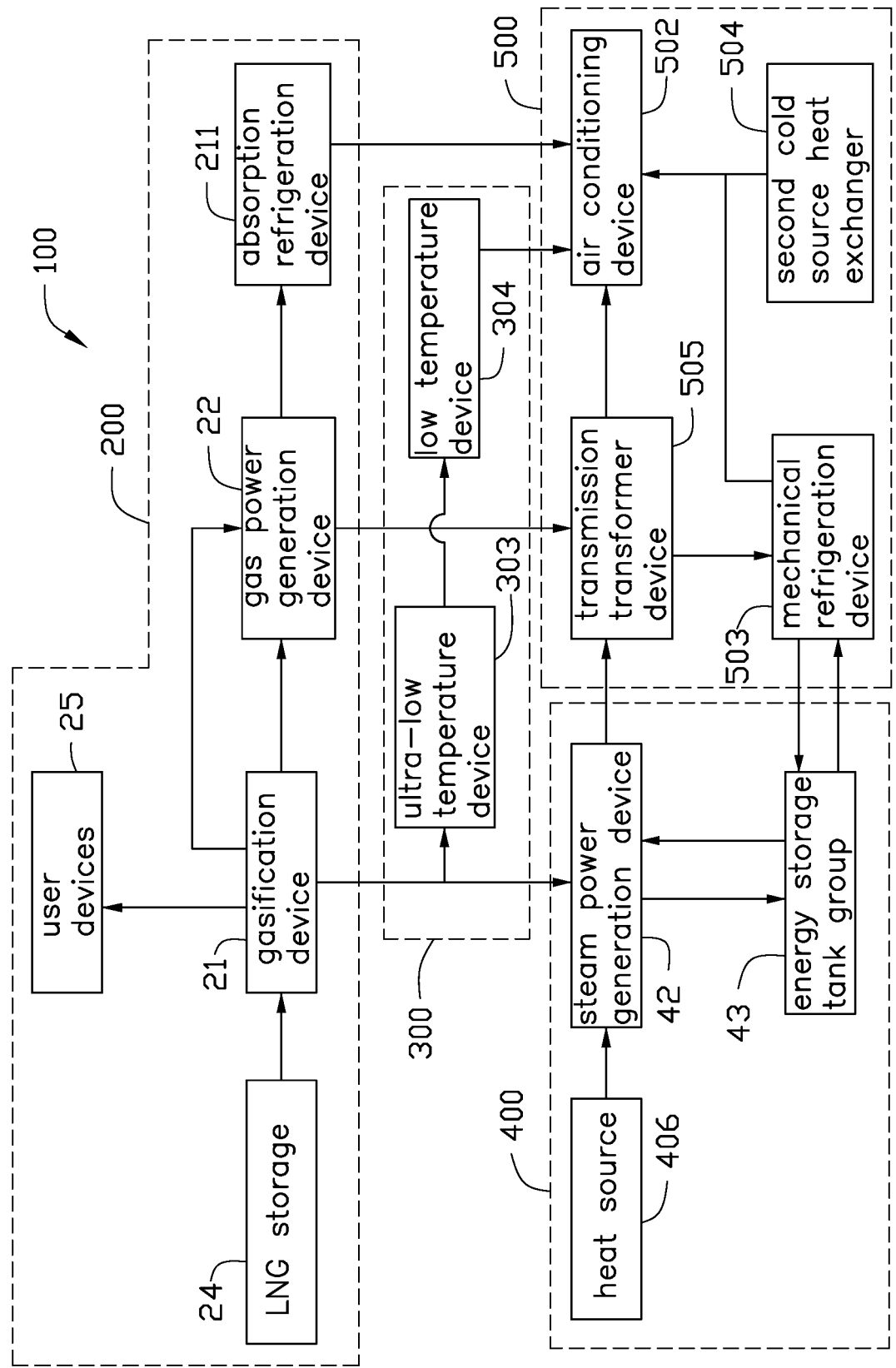
FIG. 1 is a schematic view of a system to recover negative energy from liquefied natural gas according to an embodiment of the present disclosure.

Referring to FIG. 1, a system to recover negative energy from liquefied natural gas (LNG) (hereinafter system 100) includes a gas power generation subsystem 200, a steam power generation subsystem 400, a negative energy storage subsystem 300, and a cooling subsystem 500.

The gas power generation subsystem 200 and the steam power generation subsystem 400 generate electrical power which is supplied to the cooling subsystem 500. The negative energy storage subsystem 300 stores negative energy (i.e., cold energy) supplied to the cooling subsystem 500.

The gas power generation subsystem 200 includes an LNG storage 24, a gasification device 21 connected to the LNG storage 24, and a gas power generation device 22 connected to the gasification device 21. The LNG storage 24 stores LNG supplied to the gasification device 21.

The gasification device 21 vaporizes the LNG into a gas and collects cold energy generated during the process. The LNG in gaseous form is supplied both to user devices 25 and the gas power generation device 22. The gasification device 21 is connected to the stream power generation subsystem 400 and the negative energy storage subsystem 300 and transfers the collected cold energy to the stream power generation subsystem 400 and the negative energy storage subsystem 300.

Figure 2:
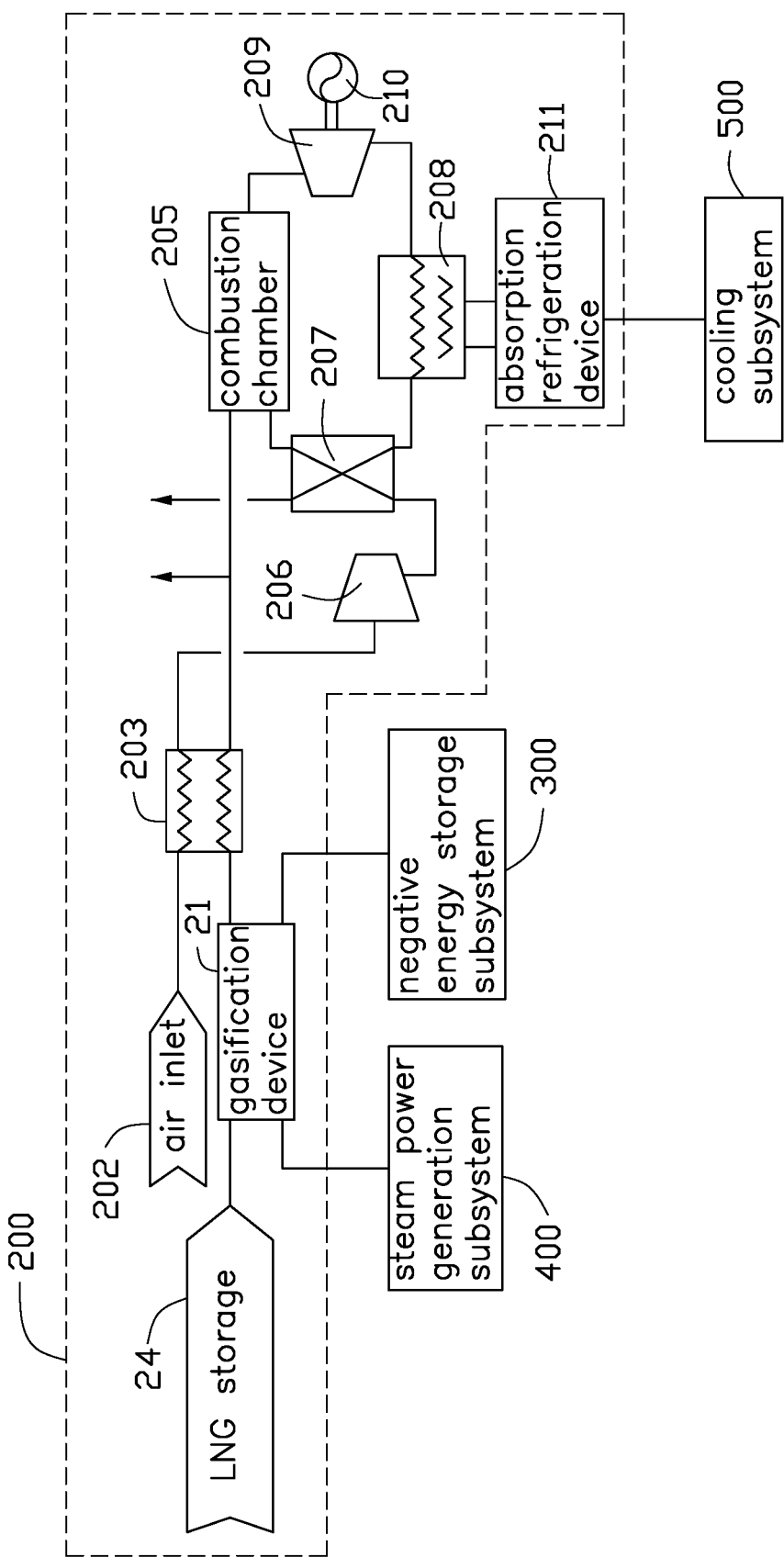
FIG. 2 is a schematic view of a gas power generation subsystem of the system of FIG. 1 according to an embodiment of the present disclosure.

Referring to FIG. 2, the gas power generation device 22 includes an air inlet 202, a first heat exchanger 203 connected to the air inlet 202 and the gasification device 21, an air compressor 206 connected to the first heat exchanger 203, and a second heat exchanger 207 connected to the air compressor 206.

The gas power generation device 22 further includes a combustion chamber 205 connected to the first heat exchanger 203, a gas turbine 209 connected to the combustion chamber 205 and the second heat exchanger 207, and a first power generator 210 connected to the gas turbine 209.

The gasification unit 21 vaporizes the LNG from the LNG storage 24 into a low-temperature gas. The low-temperature LNG gas is supplied to the first heat exchanger 203 and cools the air in the first heat exchanger 203, and then flows out of the first heat exchanger 203 and into the combustion chamber 205.

The air in the first heat exchanger 203 is cooled by the low-temperature LNG gas, and then is compressed by the air compressor 206 (cold air increases a compression efficiency of the air compressor 206, thereby increasing the amount of air entering the combustion chamber 205) to produce cooled but compressed cool air. The compressed cool air flows to the second heat exchanger 207 and is heated in the second heat exchanger 207 to produce compressed hot air. The compressed hot air flows to the combustion chamber 205. The compressed hot air is mixed with the LNG gas and burns in the combustion chamber 205, producing high pressure hot gas. The high pressure hot gas drives the gas turbine 209 to rotate, and the gas turbine 209 in turn drives the first power generator 210 to generate electrical power. The hot gas exhausted from the gas turbine 209 is returned to the second heat exchanger 207 to heat the cold air compressed by the air compressor 206, thereby reducing emission of wasted heat and improving utilization efficiency of natural gas combustion.

In the embodiment, a third heat exchanger 208 is disposed between the gas turbine 209 and the second heat exchanger 207. The gas power generation subsystem 200 further includes an absorption refrigeration device 211 connected to the third heat exchanger 208. The third heat exchanger 208 is provided with working fluid (hereinafter "the first working fluid"). The first working fluid flows between the gas turbine 209 and the absorption refrigeration device 211 to transfer the heat energy of the hot exhaust gas discharged from the gas turbine 209 to the absorption refrigeration device 211. The absorption refrigeration device 211 converts the heat energy to cold energy and supplies the cold energy to the cooling subsystem 500.

Figure 3:
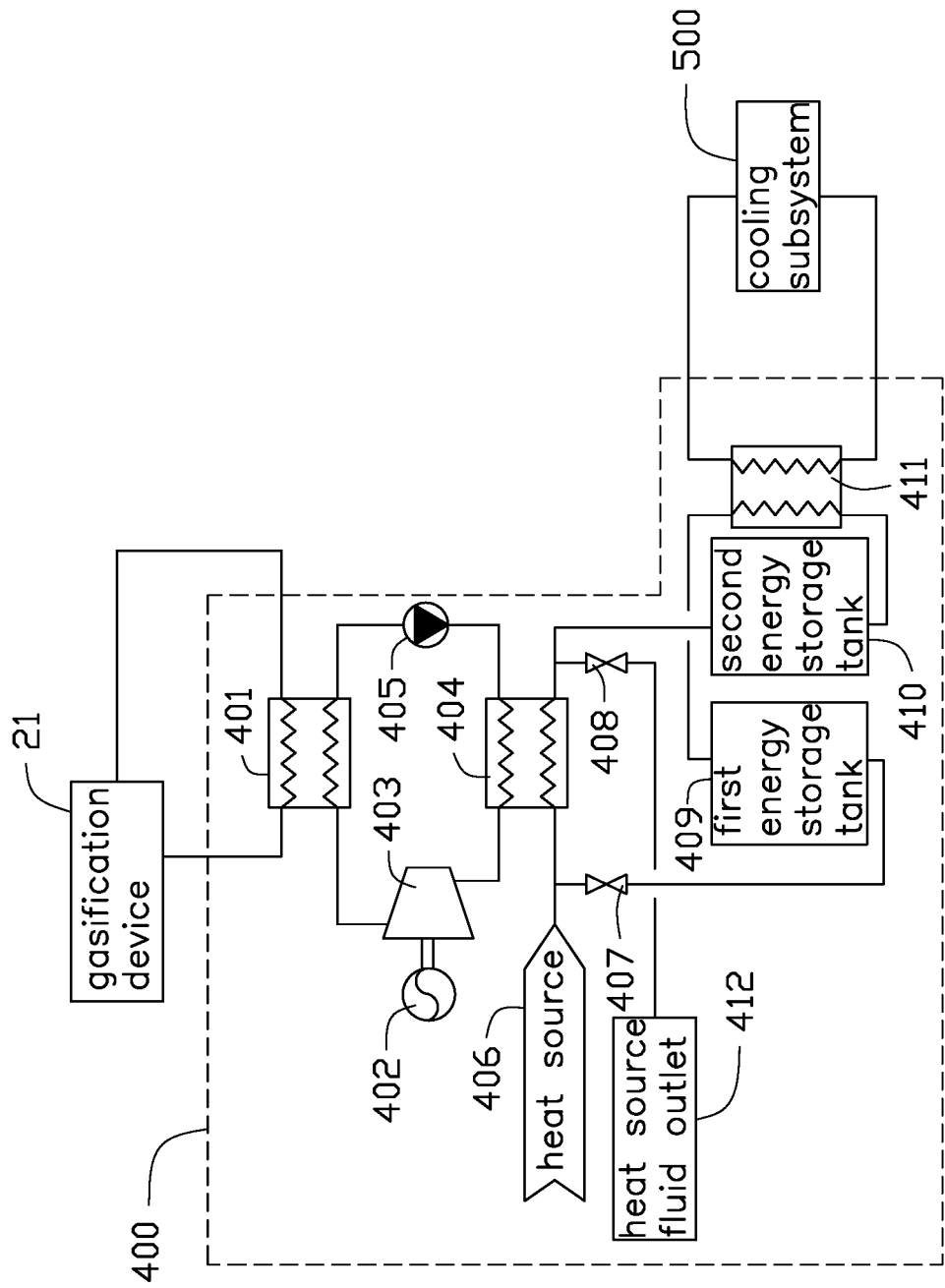
FIG. 3 is a schematic view of a steam power generation subsystem of the system of FIG. 1 according to an embodiment of the present disclosure.

Referring to FIG. 1 and FIG. 3, the steam power generation subsystem 400 includes a steam power generation device 42 connected to the gasification device 21 and a heat source 406 connected to the steam power generation device 42. The steam power generation device 42 converts the cold energy obtained from the gasification device 21 and the heat energy obtained from the heat source 406 into electrical power.

In the embodiment, the steam power generation device 42 includes a fourth heat exchanger 401, a steam turbine 403 connected to the fourth heat exchanger 401, a fifth heat exchanger 404 connected to the steam turbine 403, and a second power generator 402 connected to the steam turbine 403. The fourth heat exchanger 401 and the fifth heat exchanger 404 can communicate via a fluid pump 405.

The fourth heat exchanger 401 and the fifth heat exchanger 404 are provided with a working fluid (hereinafter "the second working fluid"). The second working fluid flows to the steam turbine 403 from the fifth heat exchanger 404 to transfer heat energy to the steam turbine 403 and drives the steam turbine 403 to rotate. The steam turbine 403 in turn drives the second power generator 402 to generate electrical power. The second working fluid then returns to the fifth heat exchanger 404 via the fourth heat exchanger 401 and the fluid pump 405 and is recycled.

In the embodiment, the cold energy generated by the gasification of the LNG in the gasification device 21 is transferred to the fourth heat exchanger 401. The second working fluid is cooled in the fourth heat exchanger 401.

In the embodiment, the heat source 406 supplies heat source fluid, a heat source fluid outlet 412, and a first valve 408 disposed between the fifth heat exchanger 404 and the heat source fluid outlet 412. The heat source fluid flows through the fifth heat exchanger 404 and transfers the heat energy to the second working fluid, and then the heat source fluid flows through the first valve 408 and is discharged from the heat source fluid outlet 412. In the embodiment, the heat source fluid can be seawater for example, the heat source 406 can be a reservoir storing the seawater.

In the embodiment, the steam power generation device 42 further includes an energy storage tank group 43. The energy storage tank group 43 includes a first energy storage tank 409, a second energy storage tank 410, and a sixth heat exchanger 411. The first energy storage tank 409 can communicate with the fifth heat exchanger 404 via a second valve 407. The second energy storage tank 410 is connected to the fifth heat exchanger 404 and the sixth heat exchanger 411. The sixth heat exchanger 411 is connected to the first energy storage tank 409. The sixth heat exchanger 411 collects the heat energy of the cooling subsystem 500 and transfers the heat energy to the first energy storage tank 409.

The first energy storage tank 409 and the second energy storage tank 410 are equipped with a working fluid (hereinafter "the third working fluid"). The third working fluid flows through the sixth heat exchanger 411 to absorb heat energy, and then the third working fluid flows to the first energy storage tank 409 to store the heat energy in the first energy storage tank 409. The third working fluid flows out of the first energy storage tank 409 and flows to the fifth heat exchanger 404 via the second valve 407. The heat energy of the third working fluid is transferred to the second working fluid, and the third working fluid flows further to the second energy storage tank 410 and then returns to the sixth heat exchanger 411 to absorb heat energy again.

In this embodiment, the third working fluid and the heat source fluid may alternately provide heat energy to the second working fluid, depending on the ambient temperature. For example, when the ambient temperature is higher, the heat source 406 gets more heat energy. The second valve 407 is closed while the first valve 408 is open, so that the heat source fluid provides heat energy to the second working fluid. When the ambient temperature is lower, the third working fluid gets more heat energy. The first valve 408 is closed while the second valve 407 is open, so that the third working fluid provides heat energy to the second working fluid.

Figure 4:
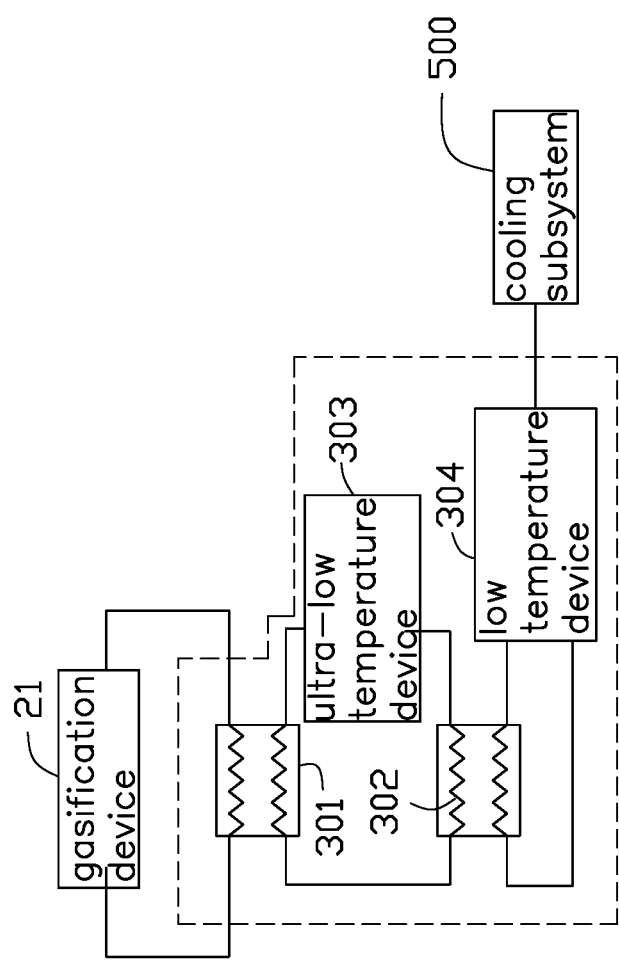
FIG. 4 is a schematic view of a negative energy storage subsystem of the system of FIG. 1 according to an embodiment of the present disclosure.

Referring to FIG. 1 and FIG. 4, the negative energy storage subsystem 300 includes an ultra-low temperature device 303 and a low temperature device 304. The ultra-low temperature device 303 is provided with a first cold energy storage medium, and the low temperature device 304 is provided with a second cold energy storage medium. The first cold energy storage medium is an ultra-low temperature cold energy storage medium and the second cold energy storage medium is a low temperature cold energy storage medium. The first cold energy storage medium is for storing cold energy obtained from the gasification device 21, and the second cold energy storage medium is for storing cold energy obtained from the ultra-low temperature device 303. The first cold energy storage medium and the second cold energy storage medium can supply cold energy to the cooling subsystem 500.

In the embodiment, the negative energy storage subsystem 300 further includes a seventh heat exchanger 301 connected to the fourth heat exchanger 401 and the gasification device 21. The gasification device 21 transfers cold energy to the steam power generation subsystem 400 and to the negative energy storage subsystem 300 through the fourth heat exchanger 401 and the seventh heat exchanger 301 respectively. The seventh heat exchanger 301 is connected to the ultra-low temperature device 303 and transfers the cold energy of the gasification device 21 to the first cold storage medium of the ultra-low temperature device 303.

In the embodiment, the negative energy storage subsystem 300 further includes an eighth heat exchanger 302 disposed between the ultra-low temperature device 303 and the seventh heat exchanger 301. The eighth heat exchanger 302 transfers the cold energy in the ultra-low temperature device 303 to the second cold energy storage medium.

Figure 5:
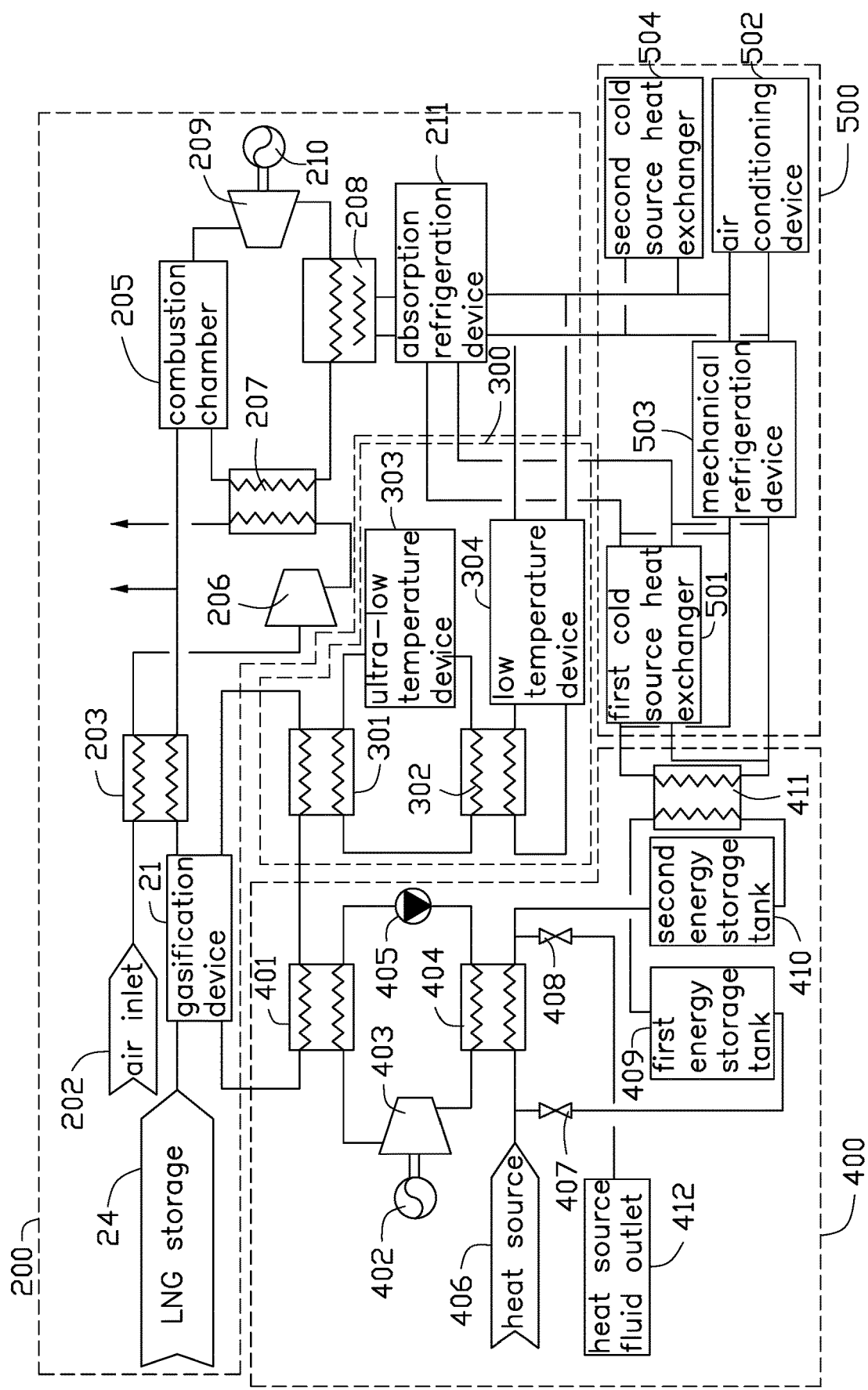
FIG. 5 shows details of the system of FIG. 1.

Referring to FIG. 5, the cooling subsystem 500 includes a mechanical refrigeration device 503 connected to the sixth heat exchanger 411 and an air conditioning device 502 connected to the mechanical refrigeration device 503. The mechanical refrigeration device 503 is powered by the steam power generation subsystem 400 and the gas power generation subsystem 200 to produce cold water. The cold water is supplied to the air conditioning device 502. The heat energy generated by the mechanical refrigeration device 503 is collected and delivered to the third working fluid by the sixth heat exchanger 411. The air conditioning device 502 is configured to provide cold energy to cool a space such as a machine room or a computer room.

In the embodiment, the cooling subsystem 500 further includes a first cold source heat exchanger 501 and a second cold source heat exchanger 504. The first cold source heat exchanger 501 is connected to the absorption refrigeration device 211 and the mechanical refrigeration device 503 and absorbs the heat energy generated by the absorption refrigeration device 211 and the mechanical refrigeration device 503. The second cold source heat exchanger 504 is connected between the absorption refrigeration device 211 and the air conditioning device 502 and assists the air conditioning device 502 in cooling down the space. In the embodiment, the first cold source heat exchanger 501 and the second cold source heat exchanger 504 obtain cold energy from natural wind, and the first cold source heat exchanger 501 and the second cold source heat exchanger 504 each can be a dry cooler or a cooling tower.

Referring to FIG. 1, the cooling subsystem 500 further includes a transmission transformer device 505 that receives the electrical power generated by the gas power generation subsystem 200 and the steam power generation subsystem 400 and provides power to the air conditioning device 502.

In the embodiment, the first working fluid, the second working fluid, and the third working fluid, can be water, ethylene glycol, mixture of water and ethylene glycol, chlorofluorocarbon (CFC), hydrofluorocarbon (HFC), hydrochlorofluorocarbon (HCFC), or a combination of one or more of the above fluids.

The present disclosure integrates the gas-fired power generation subsystem, the steam power generation subsystem, and the cold storage subsystem to carry out energy recovery, power generation, and cold storage of cold energy on gasification of the LNG thereby improving the efficiency of utilization of the LNG Furthermore, the embodiments of the present disclosure utilize various kinds of temperature supply devices and improves the stability of the overall system and environmental adaptability.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A system to recover negative energy from liquefied natural gas comprising a gas power generation subsystem, a steam power generation subsystem, a negative energy storage subsystem and a cooling subsystem;
   wherein the gas power generation subsystem comprises a gasification device connected to the steam power generation subsystem and the negative energy storage subsystem and a gas power generation device connected to the gasification device, the gasification device vaporizes liquefied natural gas to gaseous natural gas and collects cold energy generated during the gasification of the liquefied natural gas, the gasification device is connected to the gas power generation device to supply the gaseous natural gas for generating electrical power, and the cold energy is supplied to the steam power generation subsystem and the negative energy storage subsystem;
   wherein the steam power generation subsystem comprises a steam power generation device connected to the gasification device and a heat source connected to the steam power generation device, the heat source provides heat energy, and the steam power generation device converts the heat energy and the cold energy from the gasification device to electrical power;
   wherein the negative energy storage subsystem comprises an ultra-low temperature device and a low temperature device connected to the ultra-low temperature device, the ultra-low temperature device stores the cold energy from the gasification device in an ultra-low temperature cold energy storage medium, and the low temperature device stores the cold energy from the ultra-low temperature device in a low temperature cold energy storage medium;
   wherein the electrical power generated by the gas power generation subsystem and the steam power generation subsystem is supplied to the cooling subsystem, and the cold energy stored in the negative energy storage subsystem is supplied to the cooling subsystem; wherein the gas power generation device comprises an air inlet, a first heat exchanger connected to the air inlet and the gasification device, an air compressor connected to the first heat exchanger, a second heat exchanger connected to the air compressor, a combustion chamber connected to the first heat exchanger, a gas turbine connected to the combustion chamber and the second heat exchanger, and a first power generator connected to the gas turbine, the first heat exchanger cools air inlet from the air inlet to produce cool air by utilizing the gaseous natural gas from the gasification device, the air compressor compresses the cool air, the second heat exchanger heats the compressed cool air to produce compressed hot air, the combustion chamber mixes and burns the compressed hot air and the gasified natural gas to drive the gas turbine to rotate, thereby to drive the first power generator to generate electrical power.

2. The system as claimed in claim 1, wherein the gasification device is connected to user devices to supply the gaseous natural gas to the user devices.

3. The system as claimed in claim 1, wherein the second heat exchanger further receives heat energy from hot exhausted gas from the gas turbine to heat the compressed cool air.

4. The system as claimed in claim 3, wherein the gas power generation subsystem further comprises a third heat exchanger connected between the gas turbine and the second heat exchanger, and an absorption refrigeration device connected to the third heat exchanger, the third heat exchanger transfers the heat energy from the hot exhausted gas from the gas turbine to the absorption refrigeration device, and the absorption refrigeration device converts the heat energy to cold energy and supplies the cold energy to the cooling subsystem.

5. The system as claimed in claim 4, wherein the steam power generation device comprises a fourth heat exchanger, a steam turbine connected to the fourth heat exchanger, a fifth heat exchanger connected to the steam turbine, a second power generator connected to the steam turbine and a fluid pump connecting the fourth heat exchanger and the fifth heat exchanger, the fourth heat exchanger and the fifth heat exchanger are provided with a working fluid, the fourth heat exchanger receives the cold energy from the gasification device, the fifth heat exchanger receives heat energy, the steam turbine drives the second power generator to generate electrical power utilizing the heat energy from the fifth heat exchanger, the fluid pump drives the working fluid to recycle along the fifth heat exchanger, the steam turbine, and the fourth heat exchanger.

6. The system as claimed in claim 5, wherein the steam power generation subsystem further comprises a heat source fluid outlet, and a first valve connected between the fifth heat exchanger and the heat source fluid outlet, the heat source stores heat source fluid to supply heat energy to the fifth heat exchanger, and the first valve controls the discharging of the heat source fluid from the heat source fluid outlet.

7. The system as claimed in claim 6, wherein the steam power generation device further comprises an energy storage tank group, the energy storage tank group comprises a first energy storage tank, a second energy storage tank, and a sixth heat exchanger, the first energy storage tank is in communication with the fifth heat exchanger via a second valve, the second energy storage tank is connected to the fifth heat exchanger and the sixth heat exchanger, the sixth heat exchanger is connected to the first energy storage tank, the sixth heat exchanger collects heat energy of the cooling subsystem and transfer the heat energy to the first energy storage tank.

8. The system as claimed in claim 7, wherein the cooling subsystem comprises a mechanical refrigeration device connected to the sixth heat exchanger and an air conditioning device, the mechanical refrigeration device is powered by the steam power generation subsystem and the gas power generation subsystem to produce cold water supplied to the air conditioning device, and the heat energy generated by the mechanical refrigeration device is collected and delivered to the sixth heat exchanger.

9. The system as claimed in claim 8, wherein the cooling subsystem further comprises a first cold source heat exchanger and a second cold source heat exchanger, the first cold source heat exchanger is connected to the absorption refrigeration device and the mechanical refrigeration device and absorbs the heat energy generated by the absorption refrigeration device and the mechanical refrigeration device, the second cold source heat exchanger is connected between the absorption refrigeration device and the air conditioning device and assists the air conditioning device in cooling down an object.

10. The system as claimed in claim 9, wherein the negative energy storage subsystem further comprises a seventh heat exchanger connected to the fourth heat exchanger and the gasification device, the gasification device transfers the cold energy to the steam power generation subsystem and the negative energy storage subsystem respectively through the fourth heat exchanger and the seventh heat exchanger, the seventh heat exchanger is further connected to the ultra-low temperature device and transfers the cold energy of the gasification device to the ultra-low temperature cold storage medium of the ultra-low temperature device.

11. The system as claimed in claim 10, wherein the negative energy storage subsystem further comprises an eighth heat exchanger connected between the ultra-low temperature device and the seventh heat exchanger, the eighth heat exchanger transfers the cold energy in the ultra-low temperature device to the low temperature cold energy storage medium.

* * * * *